United States Patent Office 3,445,528
Patented May 20, 1969

3,445,528
TRISORBITOL DIHYDRATE
Ralph A. Hales, West Chester, Pa., assignor to Atlas Chemical Industries, Inc., Wilmington, Del., a corporation of Delaware
No Drawing. Filed May 10, 1966, Ser. No. 548,881
Int. Cl. C07c 47/18; C13k 9/00
U.S. Cl. 260—635        1 Claim

ABSTRACT OF THE DISCLOSURE

Trisorbitol dihydrate is a novel hydrate of sorbitol. Trisorbitol dihydrate is a white crystalline compound having a vapor pressure of about 0.22 mm. mercury absolute at 15.0° C., starts to melt and decompose at about 48° C., is less soluble in water than anhydrous sorbitol at temperatures below 20° C., and is more soluble in water than anhydrous sorbitol at temperatures above 20° C. Trisorbitol dihydrate may be used in pharmaceuticals and foods in place of anhydrous sorbitol and as an intermediate in the preparation of ethers, urethanes, and the like. The hydrate produces a cooler sensation on melting then does anhydrous sorbitol and thus is extremely useful for dusting chewing gum and candy to give a cool sensation in the mouth.

This invention relates to a novel hydrate of sorbitol, and, more particularly, to trisorbitol dihydrate.

Trisorbitol dihydrate (sorbitol·⅔H$_2$O) is a white crystalline compound having a vapor pressure of about 0.22 mm. mercury absolute at 15.0° C. and starts to melt and decompose at about 48° C. Trisorbitol dihydrate is less soluble in water than anhydrous sorbitol at temperatures below 20° C. and is more soluble at temperatures above 20° C. as shown in Table I. The solubility values given in Table I were obtained by addition of small amounts of the wet crystals to stirred, clear supersaturated equeous sorbitol solutions of known composition followed by slow titrations with small increments of water until the crystals dissolved at constant temperature.

TABLE I

| Temperature, °C. | Solubility, grams sorbitol per 100 grams water | |
|---|---|---|
| | Trisorbitol dihydrate | Anhydrous sorbitol |
| 0.0 | 116 | 139 |
| 5.0 | 134 | 152 |
| 10.0 | 155 | 169 |
| 15.0 | 180 | 187 |
| 20.0 | 212 | 212 |
| 25.0 | 255 | 240 |

The infrared absorption spectrum of trisobitol dihydrate (6.2% water), obtained by drying excess surface water from the hydrated crystals under vacuum at 15.0 C., is distinctly different from that of samples of crystalline sorbitol (anhydrous) and, unlike sorbitol, the spectrum shows clear evidence of the presence of water in the sample. The X-ray diffraction powder diagram of trisorbitol dihydrate is distinctly different from ASTM (American Society for Testing and Materials) diagram for sorbitol (ASTM number 4–0388).

The negative heat of solution of trisorbitol dihydrate is greater than that of crystailline sorbitol. The heat of solution of trisorbitol dihydrate is −29.9 calories per gram of the hydrate as compared to −24.6 calories per gram of crystalline sorbitol (anhydrous) when measured at 25° C. by dissolving in 20 parts water per gram sample.

Trisorbitol dihydrate may be used in pharmaceuticals and foods in place of anhydrous sorbitol and as an intermediate in the preparation of ethers, urethanes and the like. The hydrate produces a cooler sensation on tasting than does anhydrous sorbitol and thus is extremely useful for dusting chewing gum and candy to give a cool sensation in the mouth.

Trisorbitol dihydrate may be prepared by seeding a supersaturated aqueous solution of anhydrous sorbitol between 0 to 15° C. with anhydrous sorbitol crystals and stirring for several days. Trisorbitol dihydrate may also be prepared by dissolving anhydrous sorbitol crystals in water below about 15° C. until the water content of the solution is less than that represented by the solubility of trisorbitol dihydrate at that temperature and continuing the addition of anhydrous sorbitol crystals until trisorbitol dihydrate precipitates. Additional trisorbitol dihydrate may be readily prepared by seeding a supersaturated aqueous solution of anhydrous sorbitol between 0 to 15° C. with trisorbitol dihydrate crystals. Trisorbitol dihydrate may be identified by the solubility at a given temperature in water or by analysis for water content (6.2% by weight) after drying under vacuum at 15° C. to constant weight where the pressure slightly exceeds the vapor pressure of the hydrate.

The following examples illustrate means of preparing trisorbitol dihydrate:

EXAMPLE 1

2.12 grams of purified, anhydrous sorbitol crystals were added to a solution at 0° C. containing 52.61 grams purified anhydrous sorbitol, 38.87 grams water and 0.015 gram sodium chloride. The sodium chloride was present as an analytical tracer ingredient. The mixture was stirred for about 3 days at 0° C. and then filtered at this temperature. The composition of the crystals was calculated to be .67 mole water per mole sorbitol based on analyses of the wet filter cake and filtrate for water and sodium chloride. The water content of the filtrate (46.85%) showed the solubility of the trisorbitol dihydrate to be 114 grams sorbitol (anhydrous basis) per 100 grams total water.

EXAMPLE 2

993 grams of Sorbo sorbitol solution was diluted with 63 grams water to a water content of 33.7%, cooled to 10° C. and seeded with anhydrous sorbitol crystals. After stirring for 2 days, at 10° C., a portion of the magma was filtered at 10° C. and analysis of the filtrate showed a solubility of 168 grams sorbitol per 100 grams water. This solubility is in agreement with the solubility of anhydrous sorbitol at 10° C. On continued stirring of the remaining magma for an additional three days at 10° C., the magma became more viscous and on filtration at 10° C. the analysis of the filtrate showed a solubility of 157 grams sorbitol per 100 grams water. This solubility is in agreement with the solubility of trisorbitol dihydrate at 10° C. The change during the stirring of the magma from 2 to 5 days at 10° C. was transformation of sorbitol (anhydrous) crystals to the less soluble trisorbitol dihydrate and further removal of sorbitol from solution to form trisorbitol dihydrate.

EXAMPLE 3

A solution of 450 grams purified, anhydrous sorbitol in 264 grams water was cooled to 5° C., seeded with trisorbitol dihydrate and stirred for 1 day at 5° C. Then the crystals were filtered at 5° C. and the filtrate contained 132 grams sorbitol solids per 100 grams water. The wet cake was dried slowly under vacuum for 5 days at about 1° C. The dried cake was then ground and screened thru 20 mesh in a cold room. The product containing 6.28% water was stored for 44 days at 1° C. after which it was dried intermittently under vacuum for about 10 hours during a 2 day period at 15° C. Analysis of the product showed 6.21% water by the Karl Fischer method and the loss in weight on drying a sample at 60° C. on sand under vacuum was 6.2%. The water content found in the crystals corresponds to 0.67 mole water per mole sorbitol. The solubility of the trisorbitol dihydrate product when determined at 10.0° C. was 155 grams sorbitol solids per 100 grams water.

EXAMPLE 4

4000 grams of Sorbo sorbitol solution (aqueous solution of sorbitol containing 96.5% sorbitol dry basis and 29.5% water based on total weight) was added to a 12 liter flask provided with stirrer and cooled to 16° C. in a water bath. 2.5 Grams of trisorbitol dihydrate was added as seed. After 30 minutes, 9000 grams of Sorbo sorbitol solution was added over a period of one hour, during which time the temperature increased to 18° C. The contents of the flask were cooled to 16° C., stirred until thick, poured into a desiccator, and stored at 5° C. for six days under vacuum (3 mm. Hg absolute) to a water content of 26%. The desiccator was then stored at 15° C. for four days under vacuum (7 mm. Hg absolute) and then at 10° C. for three days. The contents of the desiccator were ground in a meat grinder, placed into three flasks, and dried under vacuum at 15° C. The following results were obtained:

| Flask No. | Percent by weight water | | | | Grams of sorbitol ⅔ hydrate |
|---|---|---|---|---|---|
| | 0 days | 1 day vacuum, 2 mm. | 2 days vacuum, 1 mm. | 5 days vacuum, 0.8–0.4 mm. | |
| 1 | 9.5 | 7.9 | 6.01 | 5.89 | 4,585 |
| 2 | 11.4 | 8.8 | 6.12 | 6.01 | 4,068 |
| 3 | 8.4 | 6.4 | 6.2 | 6.00 | 459 |

What is claimed is:
1. Trisorbitol dihydrate.

References Cited

UNITED STATES PATENTS 2,315,699  4/1943  Goepp _____ 260—637

FOREIGN PATENTS 216,189  1/1957  Australia.
1,115,726  10/1961  Germany.

OTHER REFERENCES

"The Merck Index," 6th ed. (1952), pp. 895–6.
Lange "Handbook of Chemistry," 6th ed. (1946), pp. 518–9.

LEON ZITVER, *Primary Examiner.*

J. E. EVANS, *Assistant Examiner.*

U.S. Cl. X.R.

99—134, 135